UNITED STATES PATENT OFFICE.

ROBERT GARDINER, OF SALT LAKE CITY, UTAH.

COMPOSITION OF MATTER.

SPECIFICATION forming part of Letters Patent No. 649,296, dated May 8, 1900.

Application filed July 15, 1899. Serial No. 723,905. (No specimens.)

*To all whom it may concern:*

Be it known that I, ROBERT GARDINER, a citizen of the United States, residing at Salt Lake City, in the county of Salt Lake and State of Utah, have invented a new and useful composition of matter for extracting copper metal from copper-bearing ores by reducing said copper metal to a solution and then by precipitation separating said copper metal from its solvent, so that it is collected on the bottom of the precipitating tank or vat in a substantially pure state, of which the following is a specification.

My composition for reducing the copper to a solution separate from the rock or other metal ready for precipitation consists of the following ingredients, combined in the proportions substantially as stated, to wit: water, substantially pure, five hundred gallons; sulfuric acid, ($H_2SO_4$,) fifty pounds; nitric acid, ($HNO_3$,) twenty-five ounces; salt, (NaCl,) twenty ounces, and permanganate of potash, ($K_2Mn_2O_8$,) ten ounces, the above proportions to be increased or diminished according to the nature and quality of the ore to be treated.

In using the above composition the ore to be treated should be crushed fine enough to pass through a sieve of, say, thirty meshes and placed in a tank. The liquid should then be applied in sufficient quantity to more than cover the ore and the whole occasionally mixed. When the copper is dissolved, which will be within twenty-four hours, according to the quality of the ore, the solution can be drawn off by siphon or other means into a vat for precipitation by any of the well-known methods for precipitating copper.

It is not claimed that the above composition of matter can be practically used for the treatment of copper pyrites, (chalcopyrite.)

I am aware that sulfuric acid has been used by chemists to dissolve copper and that a composition consisting of sulfuric acid, chlorid of sodium, and manganate of an alkali has been used for extracting gold from gold-bearing ores and that a patent was granted to James Gow Black and Robert Chellen Skeet February 28, 1899, No. 620,215; but I am not aware that all of the ingredients of my composition have been used together to extract copper from copper-bearing ores or that any of them have been practically used for said purpose.

What I claim, and desire to secure by Letters Patent of the United States, is—

1. The herein-described solution for the extraction of copper containing water, sulfuric acid, nitric acid, sodium chlorid, and a manganate of an alkali metal, substantially as described.

2. The herein-described composition of matter for extracting copper from copper-bearing ores, consisting of water five hundred gallons, sulfuric acid fifty pounds, nitric acid twenty-five ounces, common salt twenty ounces, permanganate of potash ten ounces, substantially as described.

3. The herein-described solution for the extraction of copper, containing water, sulfuric acid, nitric acid, sodium chlorid, and permanganate of potash, substantially as described.

ROBERT GARDINER.

Witnesses:
JOHN J. HAGUS,
P. W. MCCAFFAY.